US011016279B2

(12) United States Patent
Hirata et al.

(10) Patent No.: US 11,016,279 B2
(45) Date of Patent: May 25, 2021

(54) OBSERVATION DEVICE (71) Applicant: OLYMPUS CORPORATION, Tokyo (JP)

(72) Inventors: Tadashi Hirata, Tokyo (JP); Masaki Higurashi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 329 days.

(21) Appl. No.: 16/238,585

(22) Filed: Jan. 3, 2019

(65) Prior Publication Data
US 2019/0137749 A1 May 9, 2019

Related U.S. Application Data (63) Continuation of application No. PCT/JP2016/070472, filed on Jul. 11, 2016.

(51) Int. Cl.
G02B 21/24 (2006.01)
G02B 21/14 (2006.01)
G02B 7/28 (2021.01)
G02B 21/00 (2006.01)
G02B 7/36 (2021.01)

(52) U.S. Cl.
CPC ............. *G02B 21/244* (2013.01); *G02B 7/28* (2013.01); *G02B 7/36* (2013.01); *G02B 21/00* (2013.01); *G02B 21/14* (2013.01)

(58) Field of Classification Search
CPC ...... G02B 21/241; G02B 21/24; G02B 21/22; G02B 21/02; G02B 21/245; G02B 21/26;
(Continued)

(56) References Cited

U.S. PATENT DOCUMENTS 3,216,318 A * 11/1965 Gaffard ................. G02B 21/14
                                                    353/97
4,342,905 A    8/1982 Fujii et al.
(Continued)

FOREIGN PATENT DOCUMENTS

EP    3211469 A1    8/2017
JP    S62-32761 A   7/1987
(Continued)

OTHER PUBLICATIONS

International Search Report dated Sep. 6, 2016 issued in PCT/JP2016/070472.

*Primary Examiner* — William R Alexander
*Assistant Examiner* — Sharrief I Broome
(74) *Attorney, Agent, or Firm* — Scully, Scott, Murphy & Presser, P.C.

(57) ABSTRACT

An observation device includes: an illumination optical system that irradiates illumination light onto a sample, an objective optical system that has a phase modulation region and a light blocking region and that acquires an image of the illumination light transmitted through the sample, and an autofocus mechanism. The objective optical system selectively outputs the illumination light from a first output region disposed at a position where the illumination light is to be projected onto the phase modulation region and a second output region disposed at a position where a portion of the illumination light is to be projected onto the light blocking region. The autofocus mechanism causes the objective optical system to acquire an image of the illumination light while causing the illumination light to be output from the second output region, and detects the focus position of the objective optical system based on the contrast of the acquired image.

5 Claims, 11 Drawing Sheets (58) Field of Classification Search
CPC .............. G02B 21/0012; G02B 21/0088;
G02B 21/04; G02B 21/0024; G02B
21/0072; G02B 21/0076; G02B 21/082;
G02B 21/361; G02B 27/0068; G02B
21/002; G02B 21/0032; G02B 21/006;
G02B 21/06; G02B 21/16; A61B 5/0059;
A61B 10/0012; A61B 2010/0025; A61B
2503/40; A61B 3/13; A61B 3/14; A61B
90/20; A61B 10/0051; A61B 10/007;
A61B 1/313; A61B 2010/0016; A61B
2010/0074; A61B 3/1015; A61B 3/113;
A61B 3/152; A61B 5/0064; A61B
5/0068; A61B 5/6835; A61B 5/6844;
A61B 5/6886
See application file for complete search history.

(56) References Cited

U.S. PATENT DOCUMENTS

| | | | |
|---|---|---|---|
| 5,969,853 A | 10/1999 | Takaoka | |
| 6,130,776 A | 10/2000 | Takaoka | |
| 2003/0043458 A1* | 3/2003 | Minobe | G02B 21/086 359/386 |
| 2009/0168155 A1* | 7/2009 | Matsui | G02B 21/14 359/368 |
| 2011/0164166 A1* | 7/2011 | Oikawa | G02B 7/36 348/340 |
| 2012/0262561 A1* | 10/2012 | Fukutake | G02B 21/12 348/79 |
| 2017/0010455 A1 | 1/2017 | Tsujimoto | |
| 2017/0261732 A1 | 9/2017 | Takahashi et al. | |

FOREIGN PATENT DOCUMENTS

| | | |
|---|---|---|
| JP | H07-134243 A | 5/1995 |
| JP | H10-268197 A | 10/1998 |
| JP | 3362928 B2 | 1/2003 |
| JP | 2006-174764 A | 7/2006 |
| JP | 2015-072303 A | 4/2015 |
| JP | 2015-082100 A | 4/2015 |
| JP | 2015-194544 A | 11/2015 |
| WO | WO 2016/158780 A1 | 10/2016 |
| WO | WO 2017/104068 A1 | 6/2017 |

* cited by examiner

OBSERVATION DEVICE

CROSS-REFERENCE TO RELATED APPLICATIONS

This is a Continuation Application of International Application No. PCT/JP2016/070472 filed on Jul. 11, 2016, the content of which is incorporated herein by reference in its entirety.

TECHNICAL FIELD

The present invention relates to observation devices, and particularly, to a phase contrast image observation device having an autofocus function.

BACKGROUND ART

A known observation device in the related art has an autofocus function and uses a phase contrast observation method (e.g., see Patent Literatures 1 and 2). An autofocus process involves measuring the contrast of an image while changing the distance between a sample and an objective lens in the optical axis direction, and detecting the position of the objective lens where the contrast is at a maximum as a focus position where the the objective lens is in focus with the sample.

In the case of the phase contrast observation method, the contrast has a plurality of peaks, and the position where the contrast is at a maximum is not necessary the focus position. Therefore, it is difficult to determine which one of the peaks is the true focus position. In Patent Literature 1, a peak that satisfies a predetermined condition is determined to be the peak corresponding to the true focus position. In Patent Literature 2, two images are respectively acquired at focal points deviated forward and rearward from the focal plane of the objective lens, and the true focus position is determined based on a contrast difference between the two images.

CITATION LIST

Patent Literature

{PTL 1}
Japanese Examined Patent Application, Publication No. Sho 62-32761
{PTL 2}
The Publication of Japanese Patent No. 3362928

SUMMARY OF INVENTION

An aspect of the disclosure provides an observation device including: a stage on which a sample is placed; an illumination optical system that irradiates illumination light onto the sample on the stage; an objective optical system that acquires an image of the illumination light transmitted through the sample; and an autofocus mechanism that detects a focus position, which is where the objective optical system is in focus with the sample, on a basis of a contrast of the image of the sample acquired by the objective optical system, wherein the illumination optical system includes a mask that limits output of the illumination light to a first output region and a second output region, and an output-region switching element that causes the illumination light to be output selectively from the first output region and the second output region, wherein the objective optical system includes a phase modulation region that is provided in a part of a pupil of the objective optical system and that modulates a phase of the illumination light, and also includes a light blocking region that surrounds the pupil and that blocks the illumination light, wherein the first output region outputs illumination light to be irradiated onto the sample along an optical axis of the objective optical system, and is disposed at a position where the output illumination light is projected onto the phase modulation region, wherein the second output region outputs illumination light to be irradiated onto the sample obliquely relative to the optical axis of the objective optical system, and is disposed at a position where a portion of the output illumination light is projected onto the light blocking region, and wherein the autofocus mechanism changes a relative position between the stage and the objective optical system in a direction of the optical axis while causing the output-region switching element to output the illumination light from the second output region so as to cause the objective optical system to form an image of the illumination light at a plurality of relative positions.

DESCRIPTION OF EMBODIMENTS

First Embodiment

An observation device 100 according to a first embodiment of the present invention will now be described with reference to FIGS. 1 to 13.

Figure 1:
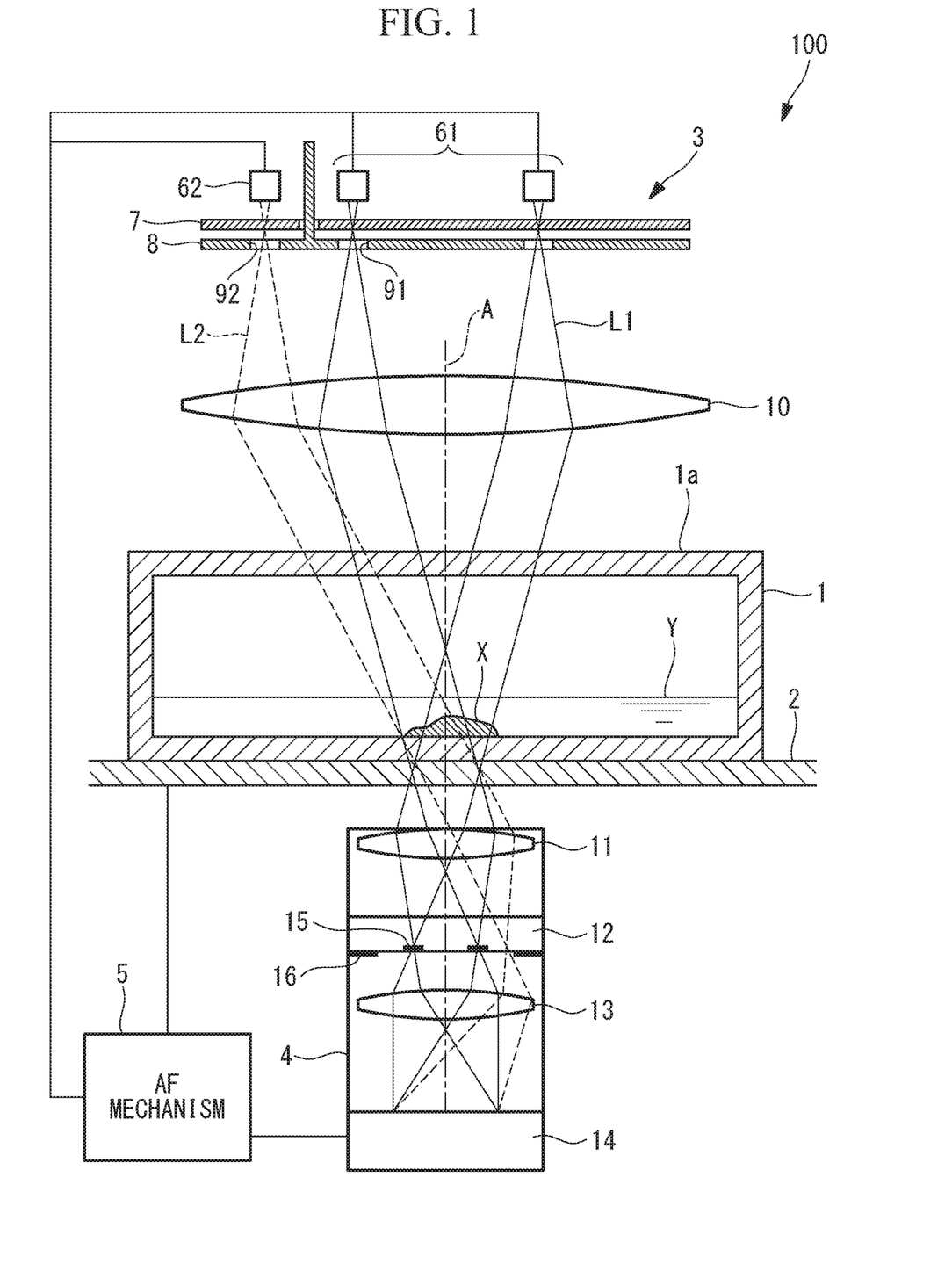
FIG. 1 illustrates the overall configuration of an observation device according to a first embodiment of the present invention.

As shown in FIG. 1, the observation device 100 according to this embodiment includes a horizontal stage 2 on which a container 1 containing a sample X is placed, an illumination optical system 3 that is disposed above the stage 2 and that irradiates illumination light beams L1 and L2 onto the sample X, an objective optical system 4 that is disposed below the stage 2 and that acquires images of the illumination light beams L1 and L2 transmitted through the sample X, and an autofocus (AF) mechanism 5 that automatically adjusts the focal point of the objective optical system 4 to the sample X.

The container 1 is, for example, a cell culturing flask having a top plate 1a and is entirely formed of optically transparent resin. The sample X is, for example, a cell within a liquid Y.

The stage 2 is formed of an optically transparent material (such as glass).

The illumination optical system 3 has two types of modes, namely, a phase contrast illumination in which an annular illumination light beam L1 is irradiated onto the sample X and an oblique illumination in which an illumination light beam L2 is obliquely irradiated onto the sample X relative to an optical axis A of the objective optical system 4. The illumination optical system 3 includes a first light source 61 for phase contrast illumination (output-region switching element), a second light source 62 for oblique illumination (output-region switching element), a scattering plate 7 that scatters the illumination light beams L1 and L2 respectively emitted from the first light source 61 and the second light source 62, an illumination mask (mask) 8 that limits passing of the illumination light beams L1 and L2 scattered by the scattering plate 7, and a collimating lens (collimating optical system) 10 that converts the illumination light beams L1 and L2 passing through the illumination mask 8 into collimated light beams.

Figure 2:
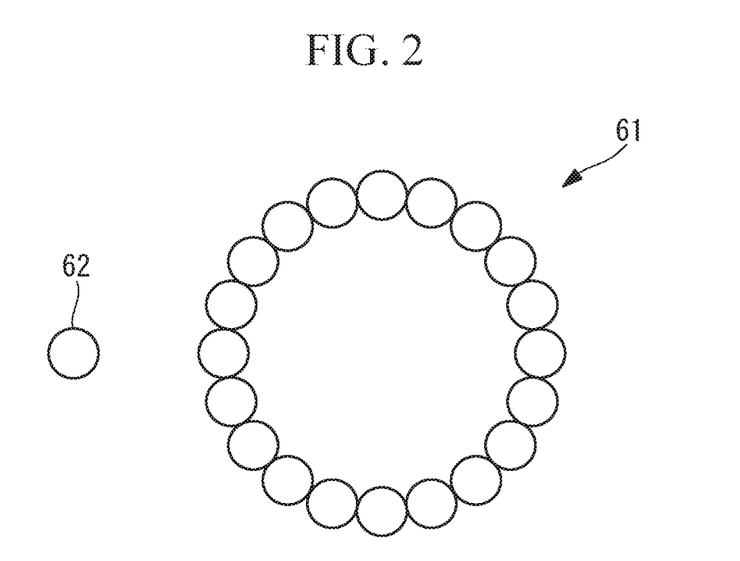
FIG. 2 illustrates an example of the arrangement of light sources included in an illumination optical system of the observation device in FIG. 1.
Figure 3:
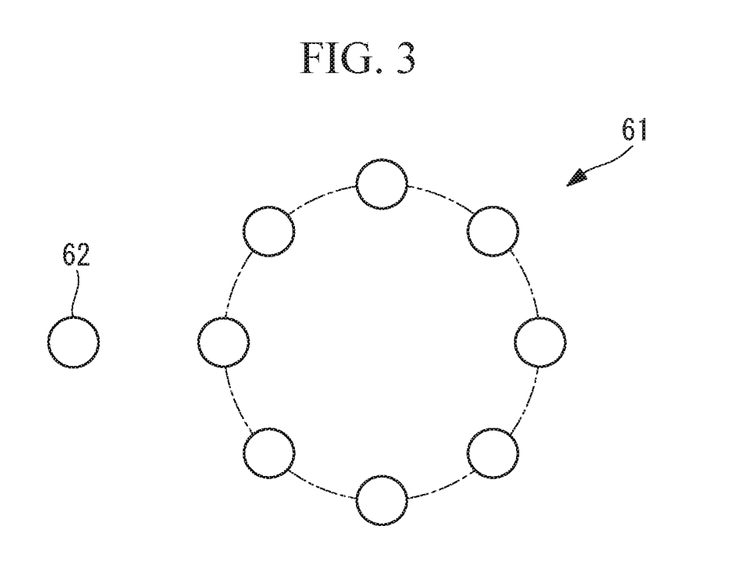
FIG. 3 illustrates another example of the arrangement of the light sources included in the illumination optical system of the observation device in FIG. 1.

The first light source 61 is an LED array formed of a plurality of LED light sources arranged annularly around a central axis, and is disposed such that the central axis is aligned with the optical axis A of the objective optical system 4. The LED light sources emit light toward the stage 2 along the optical axis A so that an annular illumination light beam L1 is formed as a whole. The plurality of LED light sources may be densely arranged, as shown in FIG. 2, or may be arranged with intervals in the circumferential direction, as shown in FIG. 3.

The second light source 62 is an LED light source that emits the second illumination light beam L2 toward the stage 2 along the optical axis A of the objective optical system 4. The second light source 62 is disposed at the radially outer side of the first light source 61 and is located away from the optical axis A in the radial direction relative to the first light source 61.

The illumination mask 8 is formed of a plate-like member having light blocking properties and is disposed substantially horizontally between the first and second light sources 61 and 62 and the stage 2. The illumination mask 8 may be integrally formed with the scattering plate 7 at one surface of the scattering plate 7, or may be a separate component from the scattering plate 7.

Figure 4:
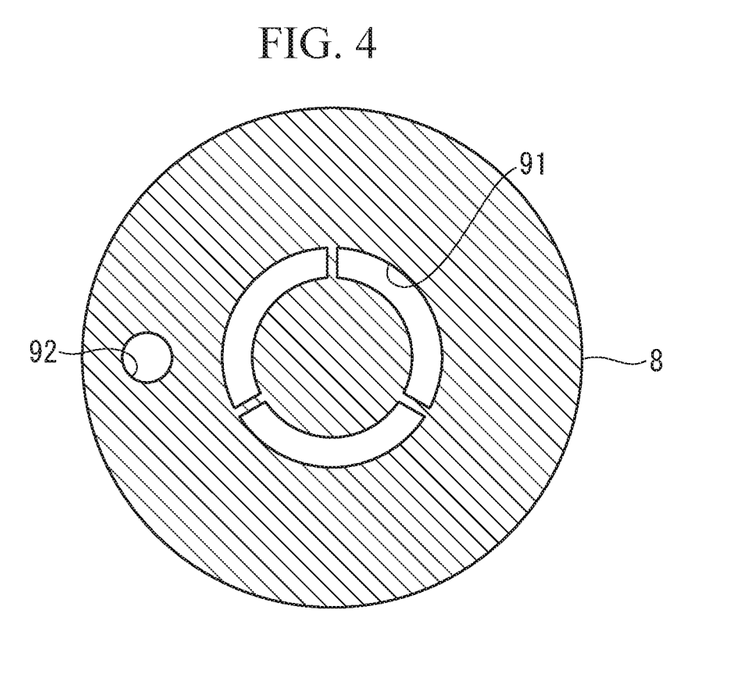
FIG. 4 illustrates an illumination mask included in the illumination optical system of the observation device in FIG. 1, as viewed along an optical axis.

As shown in FIG. 4, the illumination mask 8 has a first output region 91 that allows the first illumination light beam L1 to pass therethrough and a second output region 92 that allows the second illumination light beam L2 to pass therethrough. The first output region 91 is disposed such that the central axis thereof is aligned with the optical axis A of the objective optical system 4 and is an annular opening that faces the first light source 61 with the scattering plate 7 interposed therebetween. The second output region 92 is disposed at the radially outer side of the first output region 91 and is a circular opening that faces the second light source 62 with the scattering plate 7 interposed therebetween.

The first illumination light beam L1 emitted from the first light source 61 and scattered by the scattering plate 7 is limited from passing through the illumination mask 8 by the first output region 91, and is output toward the stage 2 from the first output region 91. The second illumination light beam L2 emitted from the second light source 62 and scattered by the scattering plate 7 is limited from passing through the illumination mask 8 by the second output region 92, and is output toward the stage 2 from the second output region 92.

As will be described later, the first light source 61 and the second light source 62 are controlled by the AF mechanism 5 such that one is turned on while the other is turned off, whereby the illumination light beams L1 and L2 are selectively output from the output regions 91 and 92.

The collimating lens 10 is disposed between the illumination mask 8 and the objective optical system 4 such that the first output region 91 and the second output region 92 are located on the focal plane of the collimating lens 10 and such that the collimating lens 10 is coaxial with the optical axis A. Accordingly, the first illumination light beam L1 that is gradually scattered after passing through the first output region 91 is converted into a substantially collimated light beam by the collimating lens 10 and is irradiated onto the sample X along the same axis as the optical axis A. On the other hand, the second illumination light beam L2 that is gradually scattered after passing through the second output region 92 is converted into a collimated light beam by the collimating lens 10 and is irradiated onto the sample X obliquely relative to the optical axis A.

The objective optical system 4 includes an objective lens 11 that collects the first illumination light beam L1 and the second illumination light beam L2 transmitted through the sample X, a pupil modulation element 12 provided at a pupil plane of the objective optical system 4, an imaging lens 13 that forms an image of the illumination light beam L1 whose phase is modulated by the pupil modulation element 12, and an imaging element 14 that photographs the image formed by the imaging lens 13.

Figure 5:
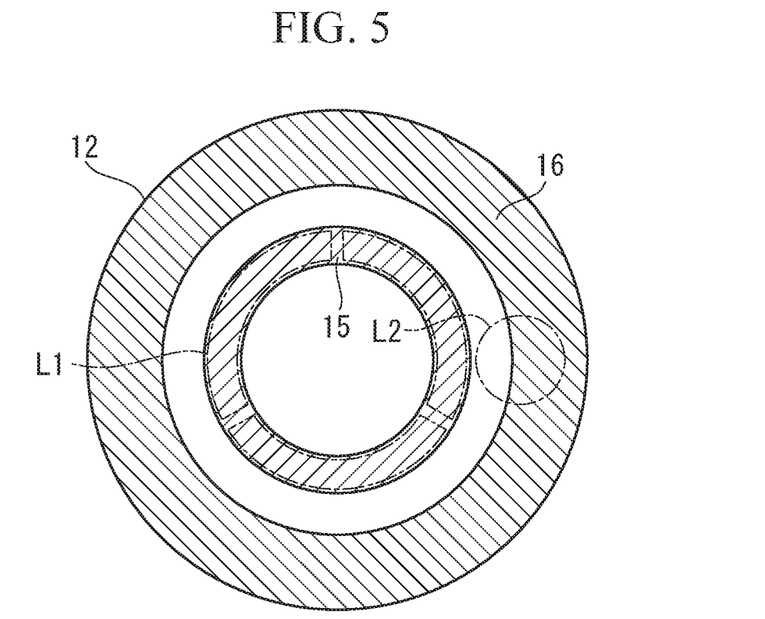
FIG. 5 illustrates a pupil modulation element included in an objective optical system of the observation device in FIG. 1, as viewed along the optical axis.

As shown in FIG. 5, the pupil modulation element 12 has an annular phase modulation region 15 that modulates the phase of the illumination light beam L1 and an annular light blocking region 16 that is provided around the phase modulation region 15 and that blocks the illumination light beams L1 and L2. The light blocking region 16 constitutes an aperture stop (also referred to as "aperture stop 16" hereinafter) serving as a pupil of the objective optical system 4. Therefore, the phase modulation region 15 is provided in a part of the pupil.

The phase modulation region 15 is formed of an annular phase film centered on the optical axis A and is configured to delay (or advance) the phase of the illumination light beam L1 by ¼ of the wavelength and to simultaneously attenuate the illumination light beam L1. The phase modulation region 15 is provided at an optically conjugate position with respect to the first output region 91. The first output region 91 is disposed such that, when the first illumination light beam L1 is output from the first output region 91 in a state where nothing is placed on the stage 2, the projection region of the first illumination light beam L1 to be projected onto the pupil modulation element 12 coincides with the phase modulation region 15. Accordingly, in the first illumination light beam L1 output from the first output region 91, direct light not diffracted by the sample X enters the phase modulation region 15, whereas diffracted light diffracted by the sample X passes through a region at the inner or outer side of the phase modulation region 15.

The light blocking region 16 is provided at the radially outer side of the phase modulation region 15 and is spaced apart from the phase modulation region 15 in the radial direction. The second output region 92 is disposed such that, when the second illumination light beam L2 is output from the second output region 92 in a state where nothing is placed on the stage 2, a portion of luminous flux of the second illumination light beam L2 to be projected onto the pupil modulation element 12 overlaps the inner edge of the light blocking region 16 so as to be vignetted by the inner edge of the light blocking region 16.

Figure 6:
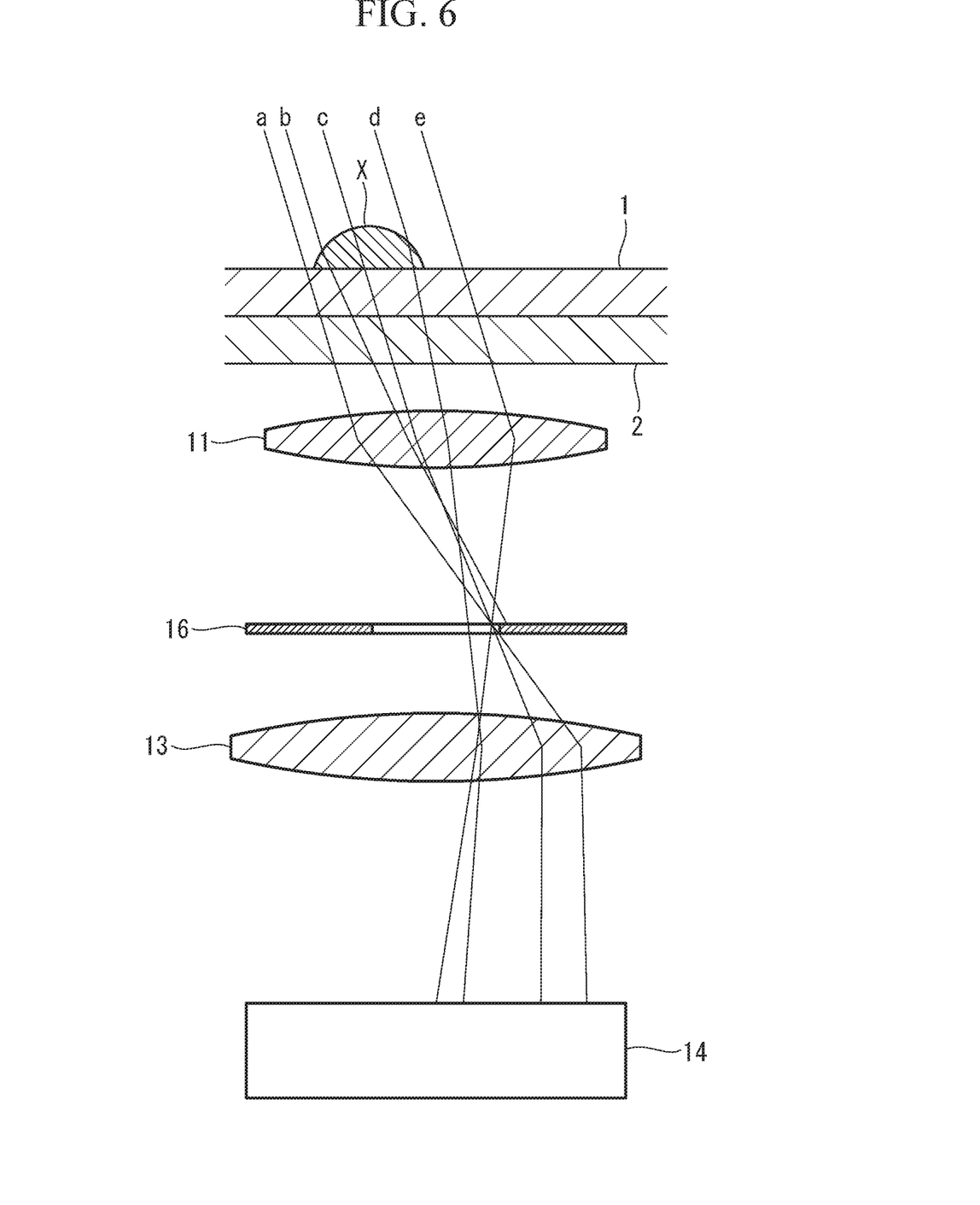
FIG. 6 illustrates the effect of an oblique illumination.

FIG. 6 illustrates the effect of the oblique illumination.

As shown in FIG. 6, the second illumination light beam L2 is irradiated from the collimating lens 10 onto the sample X obliquely from above. Light beams a and e transmitted through a region where there is no sample X and a light beam c orthogonally entering the surface of the sample X pass through the vicinity of the inner edge of the aperture stop 16 without being refracted, so that a bright image is formed. On the other hand, a light beam b transmitted through the left edge of the sample X in FIG. 6 is refracted so as to be vignetted by the inner edge of the aperture stop 16. Moreover, a light beam d transmitted through the right edge of the sample X in FIG. 6 is refracted so as to pass through a region closer to the center of the aperture stop 16, whereby a bright image is formed by the imaging lens 13.

Figure 7:
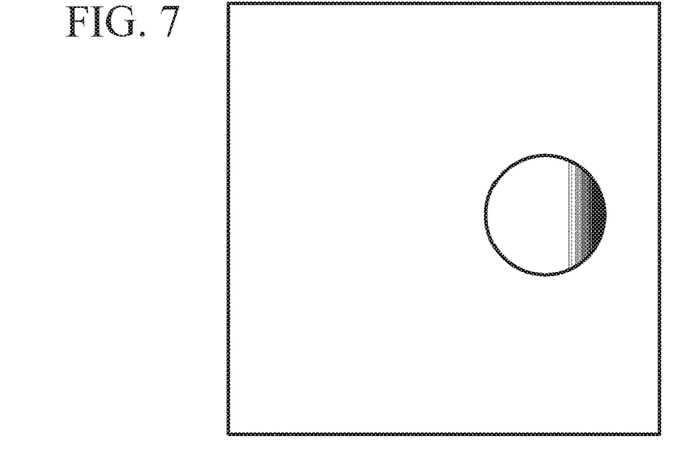
FIG. 7 illustrates an example of an image of a sample illuminated by an oblique illumination.

As a result, a high-contrast image of the sample X that is shaded and thus appears to be three-dimensional is acquired, as shown in FIG. 7.

Figure 8:
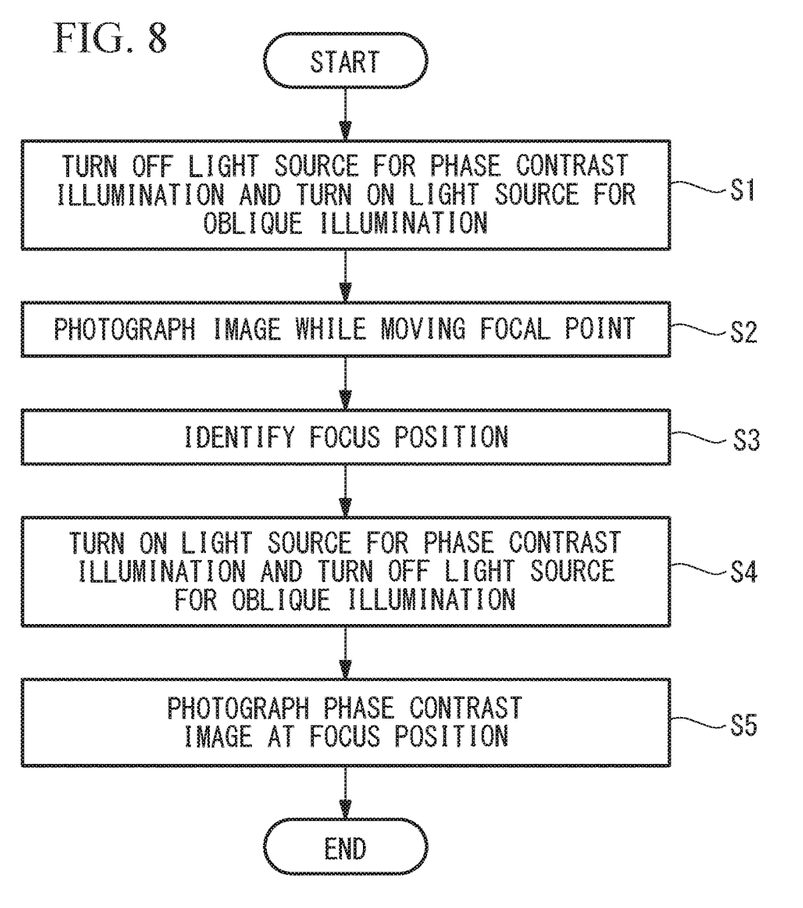
FIG. 8 is a flowchart illustrating an autofocus process performed by an autofocus mechanism of the observation device in FIG. 1.

The AF mechanism 5 controls a moving mechanism (not shown), which relatively moves the stage 2 and the objective optical system 4 along the optical axis A, and the light sources 61 and 62, so as to execute an AF process shown in FIG. 8.

In the AF process, the AF mechanism 5 turns off the first light source 61 and turns on the second light source 62 so that, of the first illumination light beam L1 and the second illumination light beam L2, only the second illumination light beam L2 is irradiated onto the sample X (step S1). Then, the AF mechanism 5 causes the imaging element 14 to execute a photographing process a plurality of times while causing the moving mechanism to relatively move the stage 2 and the objective optical system 4 so as to change the position of the focal point of the objective optical system 4 in the direction of the optical axis A relative to the sample X (step S2). Consequently, a plurality of images of the sample X illuminated by the oblique illumination are acquired by the imaging element 14.

Subsequently, the AF mechanism 5 measures the contrast of each of the images, identifies the image with the maximum contrast, and sets the relative position between the stage 2 and the objective optical system 4 when the identified image was acquired as a focus position (step S3). Then, the AF mechanism 5 causes the stage 2 and the objective optical system 4 to relatively move to the set focus position. Subsequently, the AF mechanism 5 turns on the first light source 61 and turns off the second light source 62, so as to irradiate the first illumination light beam L1 onto the sample X (step S4). Accordingly, a phase contrast image whose focal point is adjusted to the sample X is acquired by the imaging element 14 (step S5).

The AF mechanism 5 is realized by, for example, a computer equipped with a central processing unit (CPU), a main storage device, and an auxiliary storage device that stores an AF program for causing the CPU to execute the above-described AF process.

Figure 9:
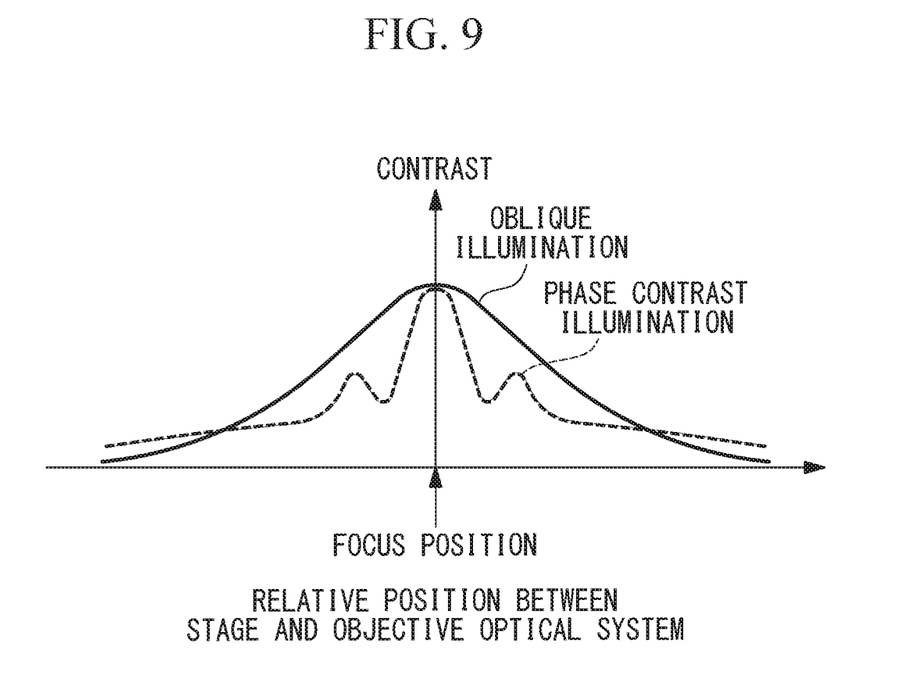
FIG. 9 is a graph illustrating the relationship between the contrast of an image and the position of a focal point of the objective optical system relative to the sample.

FIG. 9 illustrates the relationship between the contrast of an image and the amount of deviation of the relative position between the stage 2 and the objective optical system 4 from the focus position. In a case where the phase contrast illumination is used, the contrast has peaks at other positions in addition to the focus position, as indicated by a broken line in FIG. 9. In contrast, in a case where the oblique illumination is used, the contrast has a single peak only at the focus position by reaching a maximum at the focus position and decreasing as the amount of deviation from the focus position increases, as indicated by a solid line in FIG. 9. Thus, the relative position where the contrast is at a maximum can be detected as the focus position.

Accordingly, in this embodiment, the oblique illumination alone is used in the AF process, and the switching between the oblique illumination and the phase contrast illumination is performed by simply turning on and off the two light sources 61 and 62. Consequently, the focus position can be detected accurately and quickly without requiring a complicated process, which is advantageous in that the AF process can be performed quickly.

Figure 10:
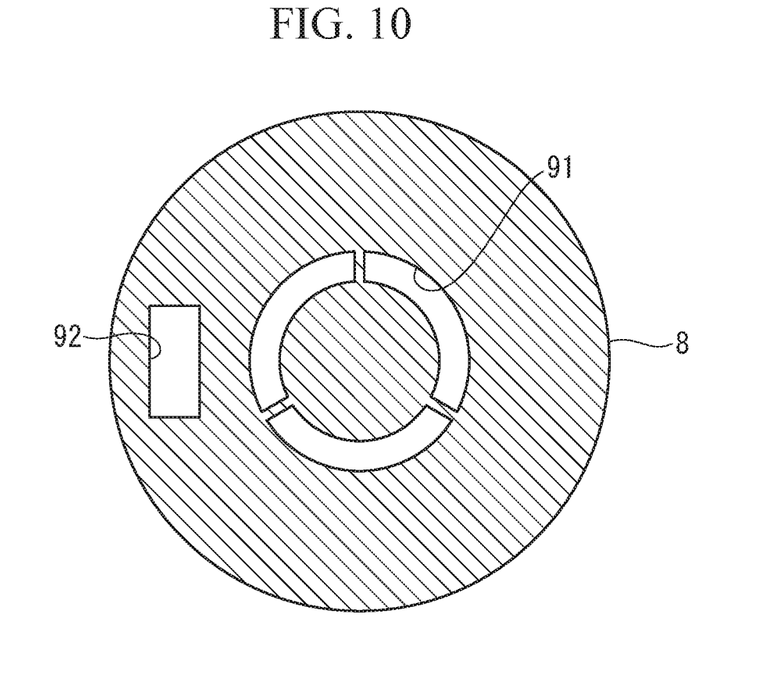
FIG. 10 illustrates a modification of the illumination mask in FIG. 4.
Figure 11:
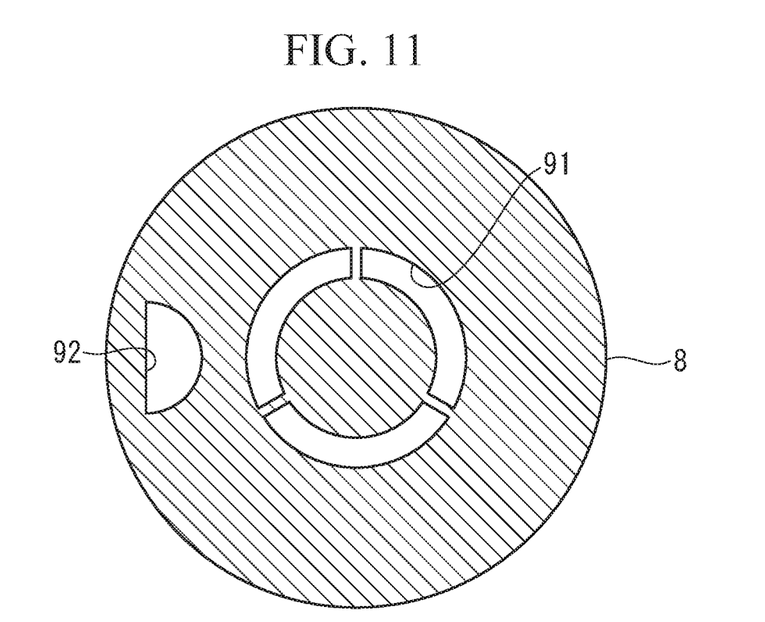
FIG. 11 illustrates another modification of the illumination mask in FIG. 4.

Although the second output region 92 is circular in this embodiment, the shape of the second output region 92 is not limited to this. For example, the second output region 92 may be rectangular, as shown in FIG. 10, or may be semicircular, as shown in FIG. 11.

Figure 12:
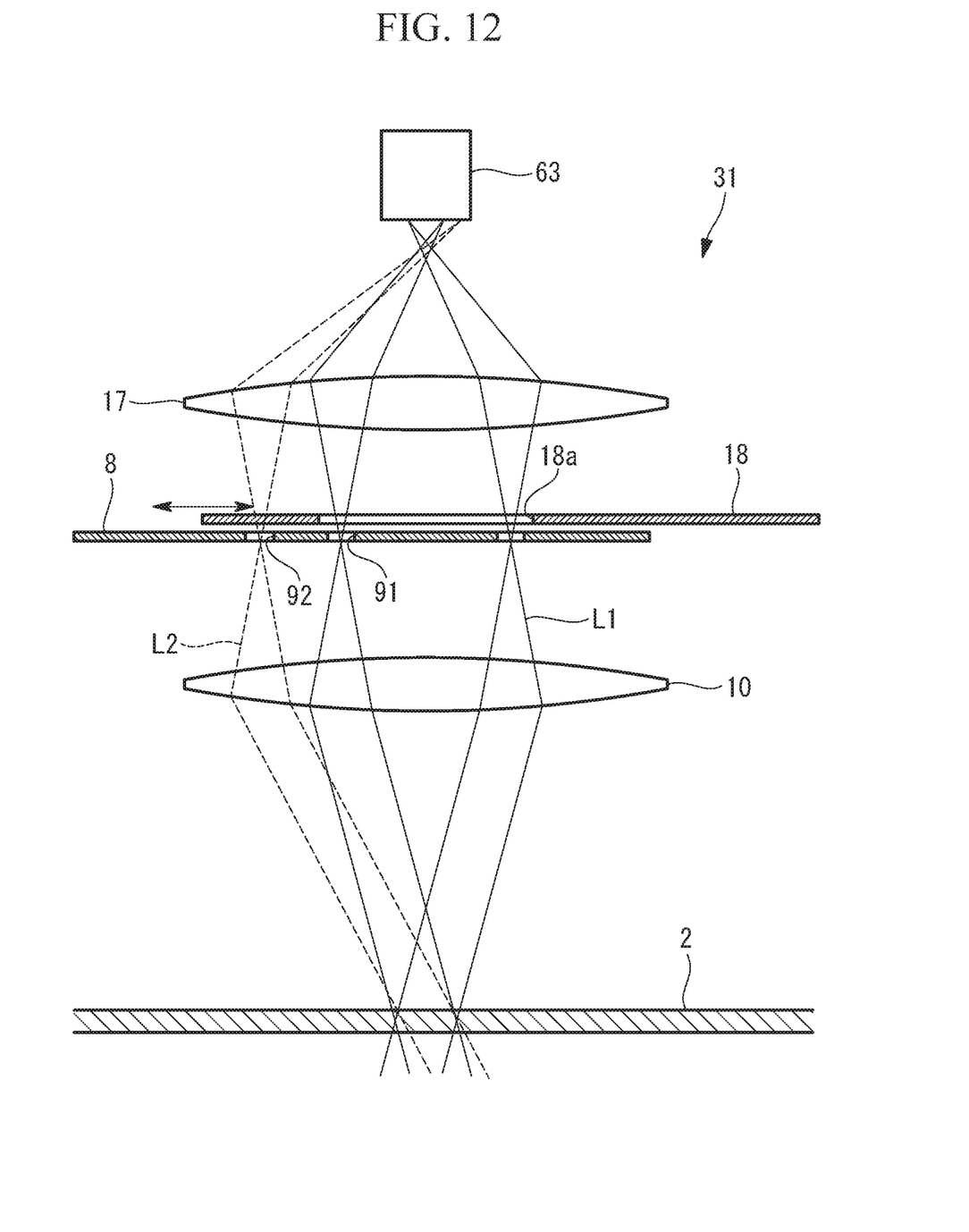
FIG. 12 illustrates the overall configuration of a modification of the observation device in FIG. 1.

Although the two light sources 61 and 62 that respectively emit the first illumination light beam L1 and the second illumination light beam L2 are provided in this embodiment, a single lamp light source 63, such as a halogen lamp, may be used as an alternative, as shown in FIG. 12. Reference sign 17 denotes a collector lens that collects an illumination light beam emitted from the lamp light source 63. It is clear from FIG. 12 that an illumination optical system 31 according to this modification uses Kohler illumination.

The illumination optical system 31 includes a movable light blocking plate (output-region switching element, limiting member) 18 that has an opening (passing region) 18a between the collector lens 17 and the illumination mask 8 and through which illumination light passes, and that causes the illumination light to pass through either the first output region 91 or the second output region 92. Other sections of the light blocking plate 18 are formed of a light blocking material, and the passing of the illumination light through the light blocking plate 18 is limited to the opening 18a alone.

Figure 13:
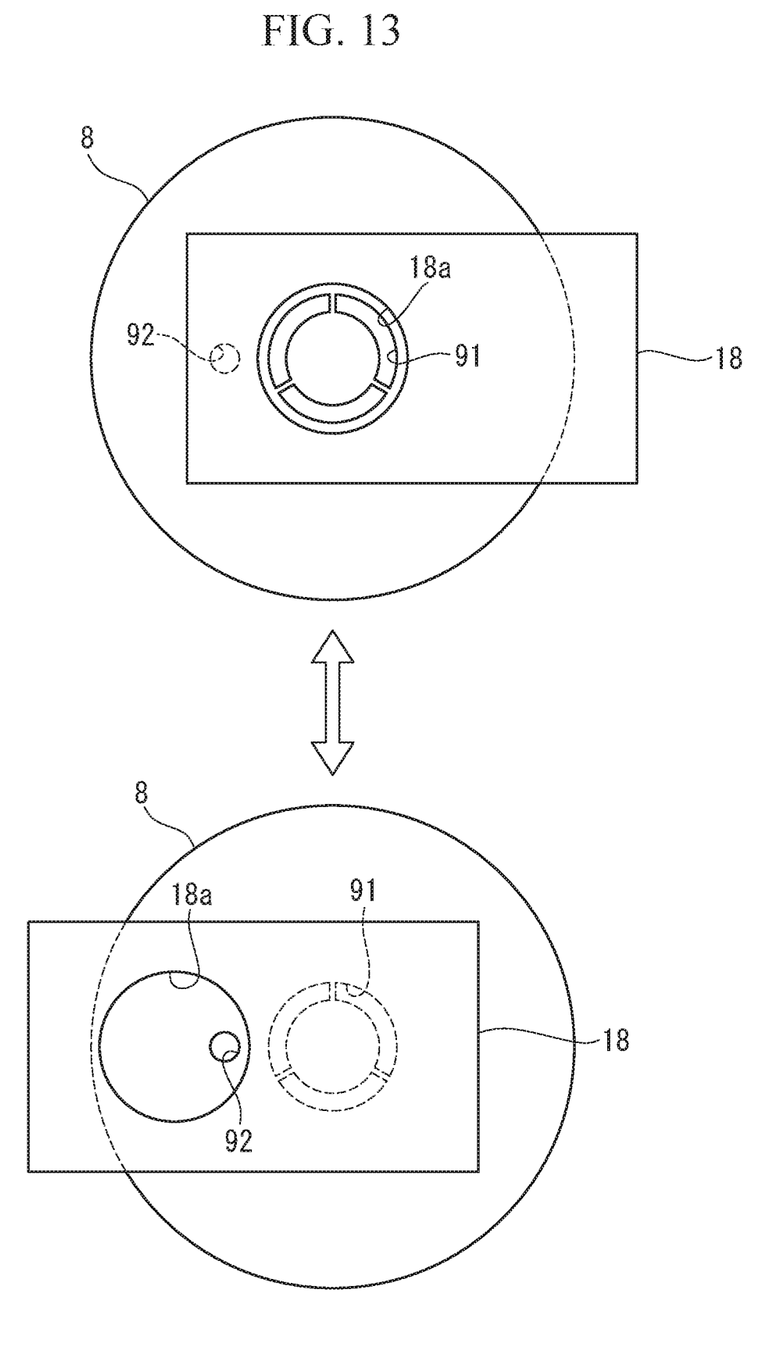
FIG. 13 illustrates the movement of a light blocking plate included in the illumination optical system of the observation device in FIG. 12.

As shown in FIG. 13, the light blocking plate 18 is slidable in the horizontal direction between a photographing position (upper section), which is where the first output region 91 is positioned in the opening 18a, and an AF position (lower section), which is where the second output region 92 is positioned in the opening 18a. When viewed in the direction of the optical axis A, the photographing position is a position where the first output region 91 is positioned in the opening 18a and the second output region 92 is covered by the light blocking plate 18. When viewed in the direction of the optical axis A, the AF position is a position where the second output region 92 is positioned in the opening 18a and the first output region 91 is covered by the light blocking plate 18. Instead of turning on and off the light sources 61 and 62, the AF mechanism 5 sets the light blocking plate 18 at the AF position when performing AF and sets the light blocking plate 18 at the photographing position when photographing a phase contrast image.

Accordingly, it is possible to switch between the oblique illumination and the phase contrast illumination by simply sliding the light blocking plate 18.

Second Embodiment

Next, an observation device 200 according to a second embodiment of the present invention will be described with reference to FIGS. 14 and 15.

In this embodiment, differences from the first embodiment will be mainly described, whereas components identical to those in the first embodiment will be given the same reference signs, and descriptions thereof will be omitted.

Figure 14:
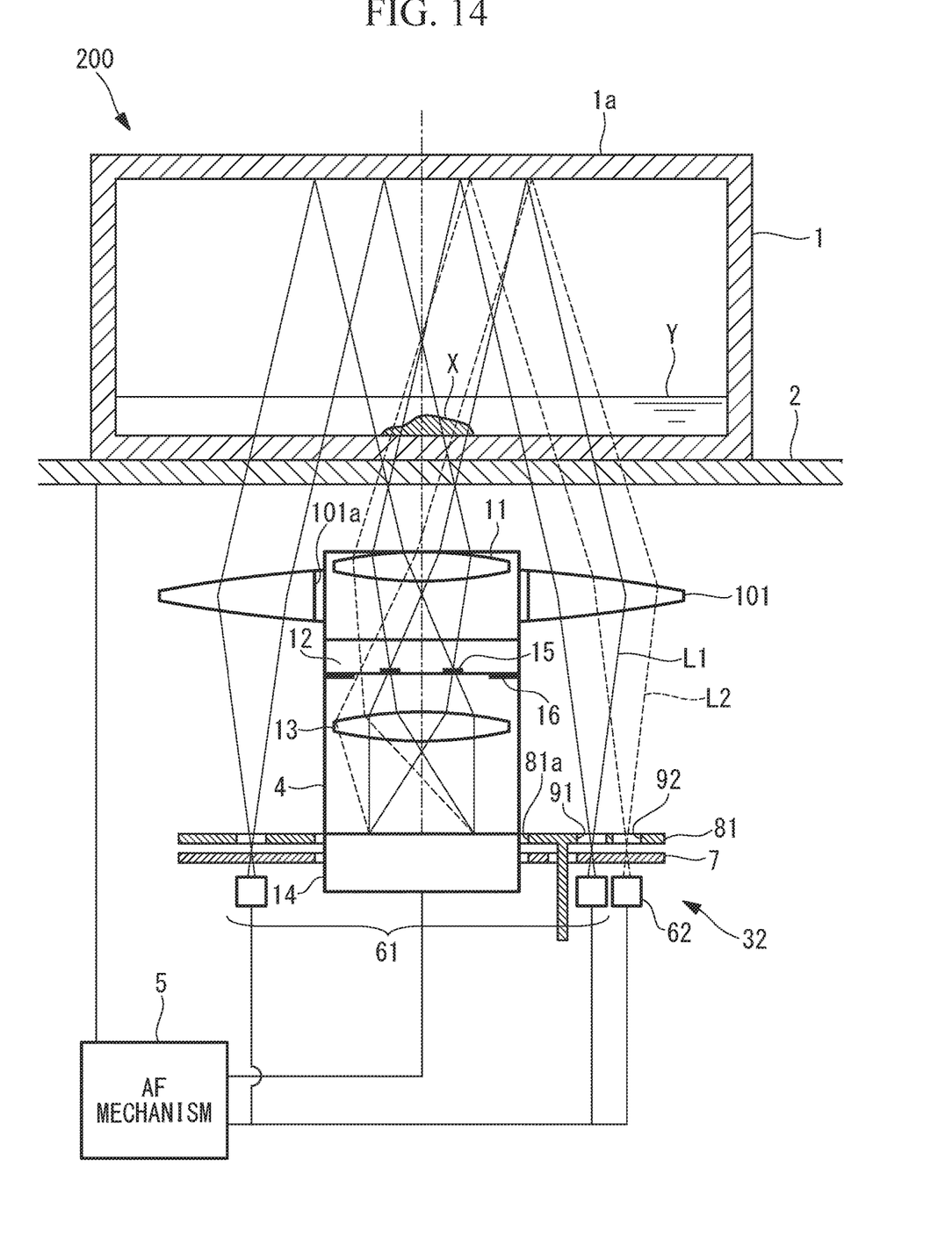
FIG. 14 illustrates the overall configuration of an observation device according to a second embodiment of the present invention.

As shown in FIG. 14, the observation device 200 according to this embodiment is different from the first embodiment in that an illumination optical system 32 is provided below the stage 2.

The first light source 61 surrounds the objective optical system 4 and is disposed such that the central axis thereof is aligned with the optical axis A of the objective optical system 4. The second light source 62 is disposed at the radially outer side of the first light source 61. The first light source 61 and the second light source 62 emit illumination light beams L1 and L2 toward the stage 2 along the optical axis A.

Figure 15:
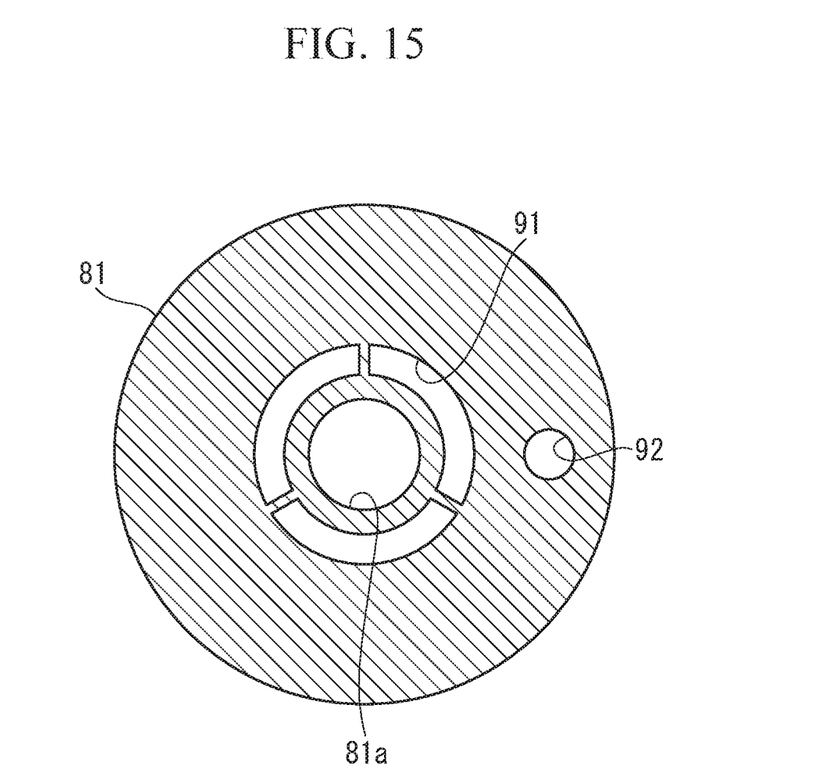
FIG. 15 illustrates an illumination mask included in the illumination optical system of the observation device in FIG. 14, as viewed along the optical axis.

As shown in FIG. 15, an illumination mask 81 further has, in the center thereof, an opening 81a in which the objective optical system 4 is to be disposed. The illumination mask 81 is disposed between the first and second light sources 61 and 62 and the stage 2 and surrounds the objective optical system 4. The second output region 92 may alternatively have the shape shown in FIG. 10 or 11.

A collimating lens 101 has, in the center thereof, an opening 101a in which the objective optical system 4 is to be disposed. The collimating lens 101 is disposed between the light sources 61 and 62 and the stage 2, surrounds the objective optical system 4, and is coaxial with the optical axis A of the objective optical system 4.

The illumination light beam L1 and the illumination light beam L2 respectively passing through the first output region 91 and the second output region 92 are converted into collimated light beams by the collimating lens 101 and are output obliquely from the collimating lens 101 toward the optical axis A of the objective optical system 4. Subsequently, the first illumination light beam L1 and the second illumination light beam L2 are transmitted through the stage 2 and the bottom wall of the container 1, are reflected at the top plate 1a of the container 1, and are irradiated onto the sample X obliquely from above. The first illumination light beam L1 and the second illumination light beam L2 transmitted through the sample X, the bottom wall of the container 1, and the stage 2 are collected by the objective lens 11, are imaged by the imaging lens 13, and are photographed by the imaging element 14.

The first output region 91 is disposed such that the projection region of the first illumination light beam L1 to be projected onto the pupil modulation element 12 coincides with the phase modulation region 15. The second output region 92 is disposed such that a portion of the second illumination light beam L2 to be projected onto the pupil modulation element 12 overlaps the inner edge of the light blocking region 16 so as to be vignetted by the inner edge of the light blocking region 16.

Since the remaining components according to this embodiment and the functions thereof are the same as those in the first embodiment, descriptions thereof will be omitted.

In addition to the advantages of the first embodiment, this embodiment is advantageous in that it can reduce the size of the observation device 200 since both the illumination optical system 32 and the objective optical system 4 are disposed below the stage 2.

From the above-described embodiments, the following aspects of the present disclosure are derived.

An aspect of the disclosure provides an observation device including: a stage on which a sample is placed; an illumination optical system that irradiates illumination light onto the sample on the stage; an objective optical system that acquires an image of the illumination light transmitted through the sample; and an autofocus mechanism that detects a focus position, which is where the objective optical system is in focus with the sample, on a basis of a contrast of the image of the sample acquired by the objective optical system, wherein the illumination optical system includes a mask that limits output of the illumination light to a first output region and a second output region, and an output-region switching element that causes the illumination light to be output selectively from the first output region and the second output region, wherein the objective optical system includes a phase modulation region that is provided in a part of a pupil of the objective optical system and that modulates a phase of the illumination light, and also includes a light blocking region that surrounds the pupil and that blocks the illumination light, wherein the first output region outputs illumination light to be irradiated onto the sample along an optical axis of the objective optical system, and is disposed at a position where the output illumination light is projected onto the phase modulation region, wherein the second output region outputs illumination light to be irradiated onto the sample obliquely relative to the optical axis of the objective optical system, and is disposed at a position where a portion of the output illumination light is projected onto the light blocking region, and wherein the autofocus mechanism changes a relative position between the stage and the objective optical system in a direction of the optical axis while causing the output-region switching element to output the illumination light from the second output region so as to cause the objective optical system to form an image of the illumination light at a plurality of relative positions.

According to this aspect, the image of the illumination light irradiated onto the sample on the stage from the illumination optical system and transmitted through the sample is acquired by the objective optical system, so that the image of the sample is acquired. In this case, the region where the illumination light passes through the mask is switched between the first output region and the second output region by the output-region switching element, so that the illumination irradiated onto the sample can be switched between a phase contrast illumination and an oblique illumination.

Specifically, in the phase contrast illumination, the illumination light is irradiated onto the sample from the first output region along the optical axis of the objective optical system. At the pupil of the objective optical system, the illumination light refracted by the sample is not transmitted through the phase modulation region, whereas the illumination light not refracted by the sample is transmitted through the phase modulation region so that the phase thereof is modulated. Accordingly, a phase contrast image of the sample is acquired by the objective optical system. In contrast, in the oblique illumination, the illumination light is irradiated obliquely relative to the optical axis onto the sample from the second output region. At the pupil of the objective optical system, the illumination light is partially vignetted by the light blocking region. Accordingly, a shaded three-dimensional sample image is acquired by the objective optical system.

In this case, in the autofocus process for detecting the focus position, the autofocus mechanism causes the objective optical system to acquire images multiple times by changing the position of the focal point of the objective optical system relative to the sample in the optical axis direction while illuminating the sample by the oblique illumination, so that a plurality of images with different contrasts are acquired. In the oblique illumination, a peak of the contrast of an image appears only at the focus position where the objective optical system is in focus with the sample. Therefore, the focus position can be accurately detected by simply comparing the magnitude of the contrast, whereby the autofocus process can be performed quickly.

In the above aspect, the second output region may be disposed at a radially outer side of the first output region relative to the optical axis of the objective optical system.

Accordingly, by setting the second output region at a position located away from the objective optical system in the radial direction, the illumination light to be output obliquely from the second output region can be made to enter the objective optical system from an edge opposite from the second output region.

In the above aspect, the illumination optical system may include a collimating optical system that converts the illumination light output from the first output region and the second output region into collimated light, and wherein the first output region and the second output region may be disposed in a focal plane of the collimating optical system.

Accordingly, the irradiation angle of the illumination light to the sample can be aligned.

In the above aspect, the illumination optical system may include a first light source disposed facing the first output region in front of the mask and a second light source disposed facing the second output region in front of the mask, and wherein the output-region switching element may turn on one of the first light source and the second light source and turn off the other one of the first light source and the second light source.

Accordingly, it is possible to switch between the phase contrast illumination and the oblique illumination by simply turning on and off the two light sources.

In the above aspect, the output-region switching element may include a limiting member that is disposed in front of the mask and that limits passing of the illumination light to a predetermined passing region, and may move the limiting member between two positions where the first output region and the second output region are respectively independently located in the predetermined passing region.

Accordingly, it is possible to switch between the phase contrast illumination and the oblique illumination by simply moving the limiting member between two positions.

According to the aforementioned aspects, an advantageous effect is afforded in that an autofocus process can be performed simply and quickly.

REFERENCE SIGNS LIST 100, 200 observation device
1 container
1a top plate
2 stage
3, 31, 32 illumination optical system
4 objective optical system
5 autofocus mechanism
61, 62, 63 light source
7 scattering plate
8, 81 illumination mask
91 first output region
92 second output region
10, 101 collimating lens (collimating optical system)
11 objective lens
12 pupil modulation element
13 imaging lens
14 imaging element
15 phase modulation region
16 light blocking region, aperture stop
17 collector lens
18 light blocking plate (output-region switching element, limiting member)
18a opening (passing region)

The invention claimed is:
1. An observation device comprising:
a stage on which a sample is placed;
an illumination optical system that irradiates illumination light onto the sample on the stage;
an objective optical system that acquires an image of the illumination light transmitted through the sample; and
a controller comprising hardware, the controller being configured to detect a focus position, the focus position being where the objective optical system is in focus with the sample, the controller detecting the focus position on a basis of a contrast of the image of the sample acquired by the objective optical system,
wherein the illumination optical system includes a mask that limits output of the illumination light to a first output region and a second output region, and the controller causes the illumination light to be output selectively from the first output region and the second output region,
wherein the objective optical system includes a phase modulation region that is provided in a part of a pupil of the objective optical system and that modulates a phase of the illumination light, and also includes a light blocking region that surrounds the pupil and that blocks the illumination light,
wherein the first output region outputs illumination light to be irradiated onto the sample along an optical axis of the objective optical system, and is disposed at a position where the output illumination light is projected onto the phase modulation region,
wherein the second output region outputs illumination light to be irradiated onto the sample obliquely relative to the optical axis of the objective optical system, and is disposed at a position where a portion of the output illumination light is projected onto the light blocking region, and
wherein the controller is configured to change a relative position between the stage and the objective optical system in a direction of the optical axis while causing the illumination light from the second output region to be output so as to cause the objective optical system to form an image of the illumination light at a plurality of relative positions.
2. The observation device according to claim 1, wherein the second output region is disposed at a radially outer side of the first output region relative to the optical axis of the objective optical system.

3. The observation device according to claim 1, wherein:
the illumination optical system includes a collimating optical system that converts the illumination light output from the first output region and the second output region into collimated light, and
the first output region and the second output region are disposed in a focal plane of the collimating optical system.

4. The observation device according to claim 1, wherein:
the illumination optical system includes a first light source disposed facing the first output region in front of the mask and a second light source disposed facing the second output region in front of the mask, and
the controller is configured to on one of the first light source and the second light source and turn off the other one of the first light source and the second light source.

5. The observation device according to claim 1, wherein the controller is further configured to control movement of a light blocking plate, the light blocking plate being disposed in front of the mask to limit passing of the illumination light to a predetermined passing region, the light blocking plate being moved by the controller between two positions where the first output region and the second output region are respectively independently located in the predetermined passing region.

* * * * *